United States Patent [19]

Tsymbal et al.

[11] Patent Number: 5,558,695
[45] Date of Patent: Sep. 24, 1996

[54] PROCESS AND UNIT FOR CONTINUOUS METAL REFINEMENT

[75] Inventors: Valentin P. Tsymbal; Sergei P. Mochalov; Kim M. Shakirov; Rafik S. Aizatulov; Boris A. Kustov; Nikolai I. Mikheev; Anatoly I. Toropov, all of Novokuznetsk, Russian Federation

[73] Assignee: Aktsionernoe Obschestvo Otkrytogo Tipa, Russian Federation

[21] Appl. No.: 513,783
[22] PCT Filed: Dec. 30, 1993
[86] PCT No.: PCT/RU93/00325
 § 371 Date: Aug. 29, 1995
 § 102(e) Date: Aug. 29, 1995
[87] PCT Pub. No.: WO95/18238
 PCT Pub. Date: Jul. 6, 1995
[51] Int. Cl.⁶ ..................................................... C21C 5/30
[52] U.S. Cl. ............................ 75/414; 75/540; 75/962; 266/162
[58] Field of Search ............................ 75/414, 531, 707, 75/500, 501, 502, 962; 266/161, 162

[56] References Cited

U.S. PATENT DOCUMENTS

| 3,565,605 | 2/1971 | Vayssiere . | |
| 4,037,043 | 7/1977 | Segsworth | 373/19 |
| 5,286,273 | 2/1994 | Nabi | 75/500 |

FOREIGN PATENT DOCUMENTS

| 480218 | 4/1965 | Russian Federation . |
| 382693 | 7/1970 | Russian Federation . |

Primary Examiner—Melvyn Andrews
Attorney, Agent, or Firm—Ostrolenk, Faber, Gerb & Soffen, LLP

[57] ABSTRACT

A process of continuous metal refinement comprising feeding molten metal to a reaction chamber, introducing gaseous and solid oxidants, adding bulk materials, fully converting the metal and slag into a foamy emulsion, creating, in the reaction chamber, an increased pulsating pressure and a considerable deviation of a system from thermodynamic equilibrium by way of creating a self-organizing system of chemical reaction with gas evolution and taking off the emulsion into a refining sump at the critical speed of egress of two-phase liquid, separating the metal and slag in said refining sump and withdrawing the gas through a high layer of emulsion at a definite rate. A unit for continuously refining metal, comprising a spherical reaction chamber (1) with a channel (5) for supplying molten metal and a channel (4) for feeding bulk materials, with a device for feeding a gaseous oxygen made in the form of oppositely arranged lances, a cylindrical connection channel (2), a refining sump (3) with tap holes (20, 15) for withdrawing metal and slag, respectively, the slag tap hole is divided into two vertical channels (16, 17) for separating slag and gas, respectively, a channel (13) for the delivery of slag-forming materials, and lances (11, 12) for feeding oxygen.

2 Claims, 3 Drawing Sheets a) (P) = 0.010%; t = 1600°C; (P2O5) = 5%.
b) (P) = 0.010%; t = 1550°C; (P2O5) = 5%.
c) (P) = 0.025%; t = 1550°C; (P2O5) = 5%.

Thermodynamically permissible region of peak values.

1. $T res. Ucr = 120$. 2. $T res. Ucr = 60$. 3. $T res. Ucr = 20$.

1. $G_{c.i.} = 150 kg/s$; 2. $G_{c.i.} = 100 kg/s$;
3. $G_{c.i.} = 50 kg/s$; 4. $G_{c.i.} = 25 kg/s$.

PROCESS AND UNIT FOR CONTINUOUS METAL REFINEMENT

FIELD OF THE INVENTION

The present invention relates to metallurgy, more specifically to the production of metal in continuous action units.

This invention can be used to most advantage for producing steel and ferroalloys.

PRIOR ART

At present work in the field of metallurgy is directed at developing and up-dating the construction of units and processes of continuously refining metals which display considerable advantages over conventional cyclic processes. There have been developed units of various designs, types and principles of continuous metal production: hearth flow-type, channeled, jet refinement, to mention just a few /1/.

In the prior art process of flow-type continuous metal refinement /2/, liquid iron and slag-forming materials are continuously delivered to unit while finished metal, slag and gas are removed via special channels. Given this method of processing, the refining rates are not high because of the small surfaces of phases contact and the small specific consumption of oxidizers.

An attempt to achieve the high rates of refinement by increasing the surfaces of contact of gaseous oxygen with metal is the development of jet refining type units 131. In the processes, metal is dispersed, using gas, into droplets which interact during the contact with an oxidizer. The resulting stream of metal droplets is fed to a ladle.

However, this process of metal processing yields a high melting loss of elements which results in a low output of molten metal and a high dusting of waste gases, and more importantly, the possibility is limited of re-processing production waste materials and solid oxidizers because of combining the processes in space and time and the impossibility of flexibly controlling the refining processes and metal heating.

There have been developed a process for continuously refining metal and a unit for realizing thereof, in which the metal is subjected to two stage processing /4/.

The conventional process comprises the steps of introducing iron into a reaction chamber, using an oxidizing agent with the additives of bulk materials, completely converting the metal and slag into a foamy emulsion, withdrawing the emulsion to a refining sump and subsequently separating the metal, slag and gas therein.

The prior art unit which implements the process comprises a reaction chamber with channels for the delivery of iron and bulk materials and with a device for feeding gaseous oxygen, a refining sump with tap holes for withdrawing metal and slag and with a branch for taking gases off, and connection channel for discharging the foamy emulsion from the reaction chamber into the refining sump.

However, these process and device do not allow one to achieve the high rates of oxidizing refinement processes, have considerable iron loss, a low degree of waste utilization and a high dusting of waste gases. The low rates of refining processes and their depth of course are explained by the fact that reactions proceed under an atmospheric pressure in a region close to equilibrium, and the specific surface of contact of the phases when the "top blast" interacts with the bath, is of a small value, less than in jet refinement. Besides, transportation of the products from the reaction chamber to the refining sump by dint of free overflow results in that the surface of contact between the metal and slag in the refining sump is reduced sharply and, along with this, the rates of refining processes. Metal loss occurs with a tap cinder in the form of ferric oxides and tiny droplets, and also with a melting loss in the form of brown smoke arising in interaction of the bath and oxygen, and the formation of a high temperature zone. This factor is simultaneously the main reason behind the high dusting of waste gaseous products which are not practically refined in the unit because they contact the foamy emulsion and pass through the emulsion layer only when they are withdrawn from the reaction chamber into the refining sump. A low degree of waste utilization is explained by the high consumption of iron, the method of interaction of said iron with oxygen and bulk materials, and also by the low utilization factor of the heat of chemical reactions and the resultant great amounts of waste in the form of tap cinder and dust-laden gas.

DISCLOSURE OF THE INVENTION

The principle objects of the present invention are to provide a process and unit for realization thereof which contribute to accelerating the processes of refining, to increasing the output of molten metal, reducing the dusting of waste gases, and ensuring a higher degree of waste utilization and a reduction of capital investments.

These objects are achieved in a process of continuous metal refinement, comprising feeding molten metal to a reaction chamber, introducing an oxidizing agent with the additives of bulk materials, fully converting the metal and slag into a foamy emulsion, withdrawing the emulsion to a refining sump, separating the metal and slag therein, and taking a gas off through an emulsion layer, characterized in that the oxidizing agent used is a solid oxidant and gaseous oxygen, said oxidizing agent being introduces at an oxygen flow rate of between 0.06 and 0.11 kg/kg of metal with the share of said solid oxidant being equal to 0.25 to 0.80; the molten metal being delivered at a specific flow rate of from 2 to 60 kg/sm$^3$ of the volume of the reaction chamber, and a pressure being built up in the chamber and sump that is between 0.4 to 3.0 MPa and 0.15 to 0.20 MPa, respectively.

These objects are likewise achieved in a unit for continuous metal refinement which comprises a reaction chamber with channels for supplying a molten metal and bulk materials and with a device for feeding gaseous oxygen, a refining sump with tap holes for withdrawing the metal and slag, and with a branch for taking the gas off, and a cylindrical connecting channel, characterized in that the reaction chamber is spherical, and the device for feeding an oxidizing agent is in the form of lances installed in opposing pairs in the chamber's wall in a diametric direction, and the ratio of the diameter of the chamber to that of the connection channel is between 3 and 12; besides, the reaction chamber is connected via corresponding channels with devices for preparing and delivering bulk materials and for feeding the molten metal, the channels for the delivery of said bulk materials and molten metal extending in a common plane with the device for supplying said oxidizing agent, and the refining sump is further provided with lances for feeding the oxygen and with a channel for delivering slag-forming materials, one of the lances being mounted in the bottom part of the sump in alignment with said connection channel in a direction opposite to the outlet of the emulsion from the reaction chamber, and the other lance and the channel for the delivery of said slag-forming materials are installed in the dome of said refining sump, a tap hole for withdrawing the slag and a branch for withdrawing the gas are combined and embodied as a horizontal channel divided into two vertical channels perpendicular to the horizontal channel, a throttle device being mounted in the upper channel as is a sprayer for vapor supply, and the lower channel is connected with a device for slag granulation, the ratio of the distance from the axis of said connection channel to the level of said tap hole for discharging the slag in the sump to the distance from the axis of the connection channel to the level of the tap hole for withdrawing the metal being between 5 and 15.

This embodiment of the refining unit and implementation of the process operations provide the attainment of high rates of chemical reactions, intensification of heat and mass exchange processes in the reaction chamber and the refining sump, a reduction of Fe loss in melting and with tap slag, the use of slag foam produced in the process as a medium for purifying high temperature dusty gases, the creation of a refining unit with smaller structural dimensions and the use, as the raw material, of production waste, and a reduction of its own waste materials on account of the tap slag obtained that is useful in the production of cement, for example.

The following fundamentally new aspects of metallurgical processes underlie the development of the process and unit according to the present invention.

/1/ the use of mechanisms of self-organizing of complex systems and the properties of self-regulation of reactions proceeding with gaseous product evolution in a system under pressure;

/2/ creation of the most favourable kinetic and thermodynamic conditions for oxidizing and reducing reactions by separating them in time and in space;

/3/ creation of conditions providing for a considerable deviation of chemical reactions from thermodynamic equilibrium;

/4/ building up in a reaction chamber of an increased pulsed pressure based on the phenomenon of nozzle "self-shut/off" in the criticality of the efflux of a two-phase flow;

/5/ ensuring of high stability of a reaction chamber by arranging the reaction zone in the central part of the refining unit and by filling it with an emulsion which serves as a heat insulating medium;

/6/ providing, in the reaction chamber, of high specific surfaces of contact of phases by way of crushing metal into tiny drops using counter oxygen jets to accomplish its full utilization;

/7/ afterburning, in the refining sump in the emulsion-filled volume, of the considerable currents of gaseous products to enhance the degree of utilization of the heat of chemical reactions and to provide the possibility of re-processing the great amounts of consumed solid oxides and basic ore materials;

/8/ effective mixing of components in the refining sump on account of a high speed flow arriving from the reaction chamber;

/9/ providing in the refining unit of two stages of technological purification of the gaseous products evolved by organizing the contact of gases and their interaction with the slag foam;

/10/ the production of a tap cinder with a low content of Fe oxides and droplets of metal, whose composition is suitable for obtaining the end product.

The mechanism of achieving said advantages of the process and the refining unit design is explained in greater detail below.

In the reaction chamber, on feeding cast iron, oxygen and bulk materials which are the waste of other production lines and facilities (undersize and dustlike lime, scale, slime, fine ore, graphite, coke, chip, etc.), there form two zones: a primary reaction zone and a zone of an emulsion-filled main volume.

In the reaction zone there proceeds the primary direct oxidation of cast iron components by the reactions:

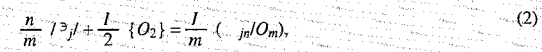

wherein $/_j/$ is j-component of cast iron.

When the counter jets of oxygen and cast iron collide, the latter is crushed into tiny droplets and there form the great specific surfaces of contact of the gas-metal phases. Owing to this, the oxygen is practically used in full, and consumed within the primary reaction zone for oxidizing the iron and the other admixtures of cast iron. Therefore, the portion of the cast iron oxidized here in connection with a high intensity of oxygen assimilation will constitute:

$$\alpha'_{c.i.} = \frac{\alpha'_{O_2} Q_{O_2}}{0.224 \, G_{c.i.} \, F(C)} \quad (3)$$

wherein $Q_{O_2}$=oxygen consumption, m³/s $G_{c.i.}$=cast iron consumption, kg/s $\alpha_{O_2}'$=portion of oxygen which interacts with cast iron $F(c)$=concentration function, m³/kg.

The function of concentrations is defined by the composition of cast iron being processed $$F(c) = \frac{/Fe/_{c.i.}}{112} + \frac{/C/_{c.i.}}{24} + \frac{/Mn/_{c.i.}}{110} + \frac{/Si/_{c.i.}}{28} + \quad (4)$$

$$\frac{/S/_{c.i.}}{32} + \frac{5/P/_{c.i.}}{124}$$

wherein /Fe/c.i, /C/c.i, /Mn/c.i, /Si/c.i, /S/c.i, and /P/c.i are respectively concentrations in cast iron of Fe, C, Mn, Si, S, and P.

Proceeding from equations (3) and (4), one can calculate the amount of oxygen required for oxidizing a certain portion of cast iron, taking account of its chemical composition.

The rates of oxidation of cast iron elements due to direct interaction with the oxygen in the area of contact of jets are derived from the equation $$U_j' = 10^{-2} \alpha_{c.i.} \, G_{c.i.} \, /_j/, \text{ kg/s.} \quad (5)$$

Experimental data on continuous pulverizing refinement show that it is possible to develop the enormous rates of oxidation of carbon in droplets during their residence in the oxidizing gas and slag. Using high-speed filming, it has been established that metal is 0.2s in a gas phase, and the rate of oxidation of carbon is by two–three orders greater than in a converter bath, with the droplets (over 35%) having a radius of between 0.15 and 1.25 mm /5/.

The resulting primary products are admitted from the reaction zone, upon intensive mixing with the flows of bulk materials, into the main volume of the reaction chamber where cast iron admixtures are oxidized indirectly according to the reaction $$(FeO) + \frac{n}{m} /^3\!j/ = /Fe/ + \frac{1}{m}(^3\!j_nO_m) \qquad (6)$$

at the phase interface of slag-metal, and also other redox reactions, heating and bulk material assimilation occurs.

Other conditions being equal, the rate of reaction (6) are the greater, the farther the system is deviated from equilibrium and the greater is the specific surface of contact of the phases.

We know consider the quantitative evaluations of influence of these factors for the claimed method compared to the prototype and presentday technologies.

The most general thermodynamic quantity of any reaction is known to be a change in Gibb's energy $\Delta G = RT \ln Pa/Ce$ which is the motive force of the process.

The ratio of products of activities to an equilibrium constant (Pa/Ce) defines a deviation of the system from thermodynamic equilibrium and is determined by the composition of metal, slag and by temperature. For steel-smelting reactions proceeding in the main volume at the interface of slag-metal phases, the expressions for (Pa/Ce) calculations can be found in literature.

FIG. 4 shows, by way of example, dependencies for the reaction of phosphorus oxidation, which reflect the influence of the composition of metal, slag and temperature (t=1500° to 1600° C.; /P/=0.010 to 0.025; (P$_2$O$_5$)±4 to 6%) on the value of (Pa/Ce). Singled out here are two areas: 1 is an area located close to an equilibrium state for the combination of the parameters of the existing steel-smelting processes (inclusive of the prototype) and 2 an area where the parameters for the claimed process are found, in which process the system is considerably deviated from the equilibrium. Analysis of the thermodynamics of the other reactions of cast iron refinement shows that with present day technologies and refining unit designs it is in principle impossible to provide the high rates of reactions and also deep refinement directed at producing a metal of high quality, since both oxidation and reduction of admixtures are possible.

In the process of the claimed invention, removal of the system from equilibrium and reaching said area occur due to the oxygen being pumped in the form of Fe oxides in slag within the limits from 35 to about 75%. The upper limit is possible theoretically and provides the greatest possible deviation of the system from equilibrium. However, the excessive concentrations of Fe oxides in slag are not desirable, because there should be other components too, which are necessary for refining reactions. A content of less than 35% is ineffective and contributes to an insignificant deviation, and this is the upper limit for the existing steel smelting processes. Therefore, most favourable is a limit of between 35 and 50% to which a motive force corresponds, as can really be seen from FIG. 4, four times greater than in the case of prior art processes, i.e., $n_{Pa/Ce}=4$, This content is attained by way of feeding a stoichiometrically necessary amount of oxygen (for a specified cast iron composition) and by assuring the required residence time of the components in the reaction chamber on account of the mechanisms of self-organization of the system and chemical reactions proceeding with evolution of a gaseous product under pressure.

The specific surface of contact of metal-slag phases in the reaction chamber is $$S_{sp} = \frac{3}{r \, \rho_{me}}, \qquad (7)$$

wherein
r=average radius of droplet, mm;
$\rho_{me}$=metal density, kg/m$^3$.

With the radius of said droplets being 0.10 to 1.0 mm, the inventors have obtained, on experimentally pulverizing cast iron with counter nitrogen/oxygen jets, the specific surface is 0.42 to 4.2 m$^2$/kg. These data are compatible with the results given in the papers /3,5/. For comparison, the specific surface in an oxygen-converter process, as most transient, is 0.05 to 0.1 m$^2$/kg, i.e. $n_{Ssp}$=8.4 to 4.2 Let us assume $n_{Ssp}$35.

Thus, the facts under consideration can increase the rate of the processes by the following value $$n_v = n_{Pa/Ce} \; n_{Ssp} = 4 \times 35 = 140 \text{ times,}$$

with $n_{Ssp}$35; $n_{Pa/Ce}$=4, as compared to the converter process and also to the most close prior art.

The rate of carbon oxidation in a converter bath can reach 1.05/min or ($U_s^{con}$) 0.0166%/s, whereas the process rate of the claimed invention is $U_s^s = n_v \times U_s^{con}$ 140×0.0166=2.32%/s. For the oxidation of cast iron with a carbon content from 4.0 to 4.5% to between 0.1 and 0.75% at the exit of from the reaction chamber, it is required that the average residence time is $$\tau \frac{ch}{r} = \frac{\Delta /C/}{U_s^s} = \frac{4.0}{2.32} \approx 1.72 \, s \qquad (8)$$

The resulting slag foam is withdrawn from the reaction chamber through a nozzle in the form of a cylindrical connection channel with radius $R_c$ that is much less than the radius of the chamber $R_{ch}$. The products are removed via the channel at a critical speed; therefore, an excess pressure will be built up in the chamber through the "self-shutoff" effect of a two-phase flow.

The rate of change of the pressure in the reaction chamber is defined by the volume of the chamber, the temperature of the medium, the speed of inflow of gaseous substances and the speed of withdrawal via a connection channel of the two-phase flow of the reaction products.

The inflow of gaseous products in the form of {CO} depends on the rate of the direct and indirect oxidation of carbon $$U_{CO} = U_{CO}^I + U_{CO}^{II} \qquad (9)$$

wherein $U_{CO}^I$, $U_{CO}^{II}$=rates of {CO} evolution from the primary zone and the main volume.

The rate of evolution of CO from the primary zone is $$U_{CO}^I = \frac{10^{-2} \, Q_{O2} \, /C/_{c.i.} \, \alpha_{O2}^I}{0.224 \, F(c)}, \, mol/s \qquad (10)$$

{CO} is isolated in the main volume of the reaction chamber as a result of the indirect oxidation of carbon by the reaction $$(FeO) + /C/ \leftrightarrows \{CO\} + /Fe/ \qquad (11)$$

therefore $$U_{CO}^{II} = k_1 s_{met-s}/C/ \, (FeO) - k_2 \, S/Fe/ \, \{CO\}, \, mol/s \qquad (12)$$

wherein $$k_1 = 420 e^{-\frac{2/200}{T}}$$

direct reaction rate constant.

$$k_2 = \frac{k_1}{k_e}$$

reverse reaction rate constant.

The equilibrium constant of this reaction is $$k_e = \frac{P_{CO} \, 10^8}{/C/ \, (\text{FeO}) \, 10} \left(\frac{702}{T}\right) \quad (13)$$

and $$\lg k_e = -\frac{5881}{T} + 4.903 \quad (14)$$

From equations (13) and (14) it follows that an increase in the product $/C/$ (FeO) can be achieved by increasing $P_{CC}$. FIG. 5 shows the ratio of the equilibrium concentrations of C to the state of slag oxidation with different $P_{CO}$.

Taking account of the pressure and temperature, the total inflow of carbon monoxide is $$Q_{CO} = \frac{22.4}{10^4} \cdot \frac{T}{P_{CO}} \cdot \frac{1}{273} \, U_{CO}, \, m^3/s \quad (15)$$

From the condition of flow continuity for residence time of one second, the volume of carbon monoxide evolved with account of T and $P_{CO}$, must be equal to the volume of the reaction chamber $$V_{ch} = \frac{22.4 \, T \, G_{c.i.} \, /C/_{in} - /C/_{out}}{10^2 \, P_{CO} \, 273 \, M_c} \quad (16)$$

wherein $G_{c.i.}$=cast iron consumption, kg/s, $/C/_{in}$=concentration of C in the incoming flow, %;

$/C/_{out}$=concentration of C at the exit from the reaction chamber, %;

$M_c$=molecular mass of C, kg;

T, $P_{CO}$=temperature, pressure in a reaction chamber.

Then the diameter of the reaction chamber for a spherical form is derived from the expression $$D_{ch} = 2 \sqrt[3]{\frac{67.2 \, T \, G_{c.i.} \, /C/_{in} \, /C/_{out}}{4\pi 10^2 \, P_{CO} \, 273 \, M_c}}, \, m \quad (17)$$

FIG. 7 shows the dependence of the diameter of a reaction chamber on pressure with differing cast iron consumption. From the analysis of the drawing it is seen that with a predetermined output, the required diameter depends on pressure, and as the pressure grows it is reduced, for example, for $G_{c.i.}$=100 kg/s, from 5 to 1.5 m.

The use of refining units of smaller dimensions results in a reduction of production areas and the shop as a whole a, factor that makes for economizing capital expenditures. However, it is inexpedient to increase a pressure above 3.0 MPa because the dimensions of the reaction chamber decrease insignificantly, and expenditures on creating reactors of higher pressure spell a growth in general capital investments. Therefore, the value of 3.0 MPa is accepted as the upper limit, according to the criterion of economy of capital expenditures. The lower limit of 0.4 MPa is chosen on the basis of the analysis of conditions of a two-phase flow in the connection channel and on the condition required for providing a deviation of the system from thermodynamic equilibrium, which is associated with the lower limit of the content of Fe oxides in slag that is equal to 35%, according to FIG. 5.

The experimental results of investigations and calculations on the mathematical modes of two-phase flows in a channel have shown that the speed at which the "self-shutoff" phenomenon arises is 40 to 160 m/s and depends on the density of a mixture, its state and the gas content by volume. Thus, the pressure in the reaction chamber is in the range from 0.4 to 3.0 MPa.

Proceeding from the average stay time as required, the volume of the chamber and the critical speed of escape chosen to provide flow continuity, there is calculated the diameter of the connection channel.

On this basis, there has been defined the range of the ratio of the diameter of the reaction chamber to the diameter of the connection channel which constitutes 3 to 12 for the above identified process parameters. FIG. 6 is a the graph of dependence of this index on diagnostic variables.

The substantiation of the operating limit of the pressure in the refining sump equalling 0.15 to 0.20 MPa is given below.

According to equation (16), the pressure in the reaction chamber is derived from $$P_{CO} = \frac{22.4 \, T(/C/_{in} - /C/_{out}) \, G_{c.i.}}{10^3 \, 273 \, M_c \, V_{ch}} \quad (18)$$

It follows from this that with a steel smelting process (temperature 1600° to 1620° C., $/C/_{in}$=4.0 to 4.5%, $/C/_{out}$==0.10 to 0.75%), for providing an operating pressure of between 0.4 and 3.0 MPa, the specific consumption of metal must be specified within 2 to 60 kg/sm$^3$. The amount of oxygen necessary for producing the metal is determined by material balance and equals 0.06 to 0.12 kg/kg of metal. A portion of a solid oxidizer (ore, scale, slime) is determined by heat balance and equals 15 to 50% of metal mass, which provides 25 to 80% oxygen of the total.

Other conditions being equal, $P_{CO}$ can be set by the specific consumption of metal $$G_{c.i.}^s = \frac{G_{c.i.}}{V_{ch}}, \, kg/sm^3 \quad (19)$$

Therefore, it is assumed that a portion of a solid oxidizer of the total consumption is 0.25 to 0.80. The lower limit is provided by the heat of the chemical reactions of oxidation of cast iron admixtures and afterburning of carbon oxides in the refining unit, and the upper limit is reached on using in the composition of bulk materials of heat carriers and reducing agents whouse consumption is established on the basis of said material and heat balances. Lime consumption is calculated from the required basicity. Thus, the re-processing of the considerable portion of scale, slime, ore and other bulk materials, which can not be used in the existing units, provides for utilizing a great amount of production waste. For the ranges of pressure from 0.4 to 3.0 MPa, FIG. 5 singles out a region of thermodynamically limiting values, which allows one to achieve the steady state concentrations of Fe oxides in slag from 35 to 75% and C concentrations in metal from 0.10 to 0.75%, which cannot be obtained in principle with the existing processes of refinement.

The pressure arising in the reaction chamber due to the "self-shutoff" effect of the connection channel in the conditions of a two-phase critical outflow is of a pulsating nature. This is explained by the following.

An inflow of Fe oxides from the primary zone is constant and the conditions of consumption are determined by the degree of development of a carbon oxidation reaction; therefore, in the case of its retardation, the oxides in the system will accumulate and gas content will reduce. Along with this, the pressure will start falling due to the increasing critical speed of withdrawing the products through a connection channel, and "self-acceleration" will develop at a certain pressure, which will increase the pressure in the system.

This being so, the pulsating pressure characteristic of the chamber of a specific size is maintained in the reaction chamber relative to a basic level, through the repeated cycles of the carbon self-regulating reaction, which include retardation pumping oxygen into the system and subsequent acceleration. The self-regulating nature of the system is also intensified by changing the cast iron input as the pressure in the reaction chamber increases.

It is hence only logical to create an excess pulsating pressure due to the self-organization mechanisms of the non-equilibrium system by selecting the structural dimentions of the reaction chamber, the connection channel and by specifying the corresponding values of incoming flows, which mechanisms manifest themselves as the joint "self-shutoff" effect of the connection channel in the critical conditions of a two-phase outflow and "self-regulation" of the chemical reactions proceeding with the gaseous product evolution in the reactor under pressure.

The resultant products obtained in the reaction chamber in the form of a foamy emulsion are admitted via the connection channel into the refining sump where metal, slag and gas are separated.

To a zone of product yield from the reaction chamber in a direction opposite to that of emulsion escaping from the connection channel, there is fed oxygen with the quantity of metal consumed between 0.01 to 0.04 $m^3/kg$ for the afterburning of carbon oxide within a column of slag foam. Oxygen supply in this way assures the best afterburning of carbon oxides in the volume of the refining unit, suppressing of the kinetic energy of the flow coming out of the reaction chamber and achieving of a high factor of utilizing the heat of chemical reactions and also provides the posibility of flexibly regulating the temperature of metal.

Oxygen consumption in the range from 0.01 to 0.04 $m^3/kg$ of metal contributes to afterburning the carbon oxide by 25–90%.

The emulsion from the reaction chamber is admitted at a high speed and pressure to a zone located directly above the interface of metal and slag. Owing to a high speed flow and cavitation phenomena in the exit zone, a high rate of heat and mass exchange processes is reached and conditions are created for further refinement and foam-formation. In addition, slag foam formation is intensified through the appearance of a great number of small bubbles of carbon oxide, which are caused by the metal droplets soaring in the slag in an area below the edge of a nozzle. In this area of the sump, there develops the subsequent refinement of admixtures at the metal-slag phase interface.

The concentration of admixtures in the finished metal is defined by their content at the exit from the reaction chamber, slag composition, the specific surface of contact of the phases and by the residence time in the sump. The composition of said slag having any refining properties in the sump can be obtained by adding the corresponding materials.

Phosphorus is primarily oxidized in the reaction chamber and the sump where a significant deviation is ensured from thermodynamic equilibrium, while sulfur is oxidized in the refining sump in a zone above the edge of the nozzle where high temperature is achieved the required slag basicity and its low state of oxidation which is reduced as the slag phase rises up, as a result of reduction processes. The required carbon concentration is provided by feeding a required amount of oxygen to the reaction chamber, the consumption of which, as compared to the converter process, is less by 6 $m^3/t$ due to a fuller utilization thereof.

Above the axis of the connection channel is a high column of slag foam which consists of the bubbles of carbon oxide and slag film. In the bottom portion of said slag foam, there are also metal droplets at whose boundary with the slag phase there proceed reactions, which result in reducing the state of slag oxidation.

Besides, as the slag rises up, the state of its oxidation is reduced due to interaction with the carbon oxide and, therefore, the slag leaving the sump does not practically contain metallic shot and has the content of Fe oxides between 5 and 8%.

The indices of metal loss with slag, according to the claimed process are taken the lower limits of the converter process /6/ presented in Table I.

TABLE I

| | Value of relative metal loss, kg/t | | |
| --- | --- | --- | --- |
| | Converter process | | Process |
| Item | average value | limits of change | claimed, indices |
| 1. Iron oxidized into slag | 17 | 3 to 35 | 3 |
| 2. Iron shot in tap slag | 5 | 2 to 10 | 2 |
| 3. Loss with flue gases | 12 | 6 to 18 | 1.5 |
| Total | 34 | 11 to 63 | 6.5 |

Loss with flue gases is from 17 to 110 of the average loss of a converter process due to their passage through a high column of slag foam.

Thus, said factors make for the total reduction of iron loss by the value of from 25 to 28 kg/t as compared to the converter process.

The basic parameters of a refining sump, namely, the distance from the axis of a connection channel to a tap hole (the height of slag foam) and its sectional area (diameter) are first of all determined from the condition of providing a pre-set degree of purification of waste gases from dust. More, also taken into consideration is the condition of providing the residence time of slag in the sump that is required for terminating the refining processes of Fe oxide reduction in the slag foam, oxidizing of carbon and harmful admixtures in metal and in the slag layer adjoining thereof.

For the task of gas purification to be solved, the top part of the refining sump (a layer of slag foam above the edge of a connection nozzle) can, with a great degree of approximation, b considered as the already finished foam purifier /7/.

On calculation of the parameters of such purifiers, the foamy conditions, whose range of existance is within Reynolds numbers from $8 \times 10^4$ to $28 \times 10^4$ are most favourable from the viewpoint of productivity and efficiency of purification. Moreover, these conditions are self-similer hydrodynamic ones. A reduced gas velocity in the apparatus (Reynolds numbers) that is below the lower limit spells bubbling conditions having low efficiency and providing for entrapping particles of over 5 μm in size, whereas, under foamy conditions it is possible to effectively catch particles over 2 μm in size on account of a turbulent inertia mechanism. The excess of the upper limit by Reynolds number transfers the process into region of wave conditions when gas breakouts can form i.e., an abrupt reduction in a the efficiency of purification and refining processes.

Taking account of these conditions, it is possible to calculate the sectional area (diameter) of the refining sump from the critical speed of transition from foamy to wave conditions which can be assumed within 2.0 to 2.3 m/s, and, with an increase in the height of the liquid layer up to 3 m/s, which just constitutes the basis for calculations of the sectional area and diameter of the sump.

$$F_o = \frac{Q_{co}}{3}, m^2$$

There also are relations for calculating the height of a stable foamy layer, inclusive of those at an increased pressure in the refining sump. However, this height for our conditions can be considered only as the minimum required one.

An increase in the height of the initial liquid layer and foam causes the region of existence of the foamy conditions to expand, and simultaneously there is observed an almost linear dependence of the degree of purification on the height of said foam layer, a growth in which results in an increased surface of phase contact.

As the analog of a combination of a refining sump and a foamy purifier one can take foamed slag conditions in a converter with which the dust content of gases is reduced (to 1/7 to 1/10) in comparison with slagless blowing. However, a stable and long existence of foamy conditions in the converter is difficult to be realized.

In view of the foregoing, the ratio of the heights of the top part of the sump (from the axis of the connection channel to the level of the slag tap hole) is selected within 5 to 15. The lower limit reflects the theory and practice of designing the converters where the volume of foamed slag exceeds metal volume roughly 4 to 5 times. Besides, the minimum volume (height $H_s'$) or the top part of the sump $V_s'$ is determined by the residence time of gases therein $\tau_o^{res}$ that must not be less than the time of their stay in the reaction chamber $$V_s'=H_s'F_o=Q_{CO}\tau_o^{res}.$$

Considering that for the critical speed of foamy conditions being equal to 3 m/s, the area of the refining sump is $F_o=Q_{CO}/3$, we obtain $H_s'=\delta\tau_o^{res}$ with $\tau_o^{res}=2^s$, $H_s'=6$ m. The upper limit is selected for reasons of precluding the possibility of going into wave conditions and providing the maximum possible reduction of dust content compared to a converter due to the double-triple increase of the surface of a phase contact for the particles remaining in the gas with fractions of less than 2 m. Thus, for gases to be purified effectively, it is necessary to select the ratio of the heights (or volumes) of the top part of the refining sump to its bottom part within 5 to 15, which creates in the sump a pressure of between 0.15 and 0.20 MPa.

A further raising of the level of slag foam (the height of the top part) is limited by structural considerations (the possibility of being inscribed into the buildings of the existing shops and also by the difficulties involved in maintaining the temperature conditions of the upper layers of slag foam and its flowability.

A further increase in the degree of purification of waste gases along with the creation of conditions for continuous slag granulation is carried out by realizing the second stage of inner technological cleaning performed in a horizontal channel for taking the gas and slag off, which is further divided into two vertical channels for separating the gas and slag. The selection of the sectional area of said horizontal channel is calculated on the basis of the speed of a gas flow obtained therein within 15 to 25 m/s, which allows one to realize conditions (the principles of action) which are close to gas washers with the inner circulation of liquid. Moreover, an increase in the speed of the gas flow from 15 to 25 m/s with a volume portion of the liquid phase being $1\times10^{-3}$ m³/m³ and more improves the efficiency of catching the particles having a size of 1 μm from 5 to 75%, and a particle size of 5 μm up to 99%.

As a result of the passage of gases through two stages of inner technological cleaning, the dust content is 6 to 10 g/m³.

Under the dome of the refining sump there is fed oxygen with a consumption of from 0.005 to 0.01 m³/kg of metal to regulate the temperature conditions and additives increasing the flowability of slag; namely, a mixture of $SiO_2$ and $Al_2O_3$, bauxite, fluorspar, crushed grog, etc, to maintain the slag foam coming out along the horizontal channel in a liquid state. The supply of slag additives is simultaneously coordinated with the objects of producing the granulated slag ($CaO$=63 to 67, $SiO_2$=21 to 24, $Al_2O_3$=4 to 7, $FeO$=5 to 8) that is close to mixtures, as to composition of cement.

Thus, by reducing the dust content of waste gases to 6 to 10 g/m³, producing slag as a raw material for production of, say, cement and also by using, as a raw materials, the waste of other processes one can achieve a high degree of waste utilization.

EMBODIMENT OF THE INVENTION

Continuous steel production is considered as an example.

Figure 1:
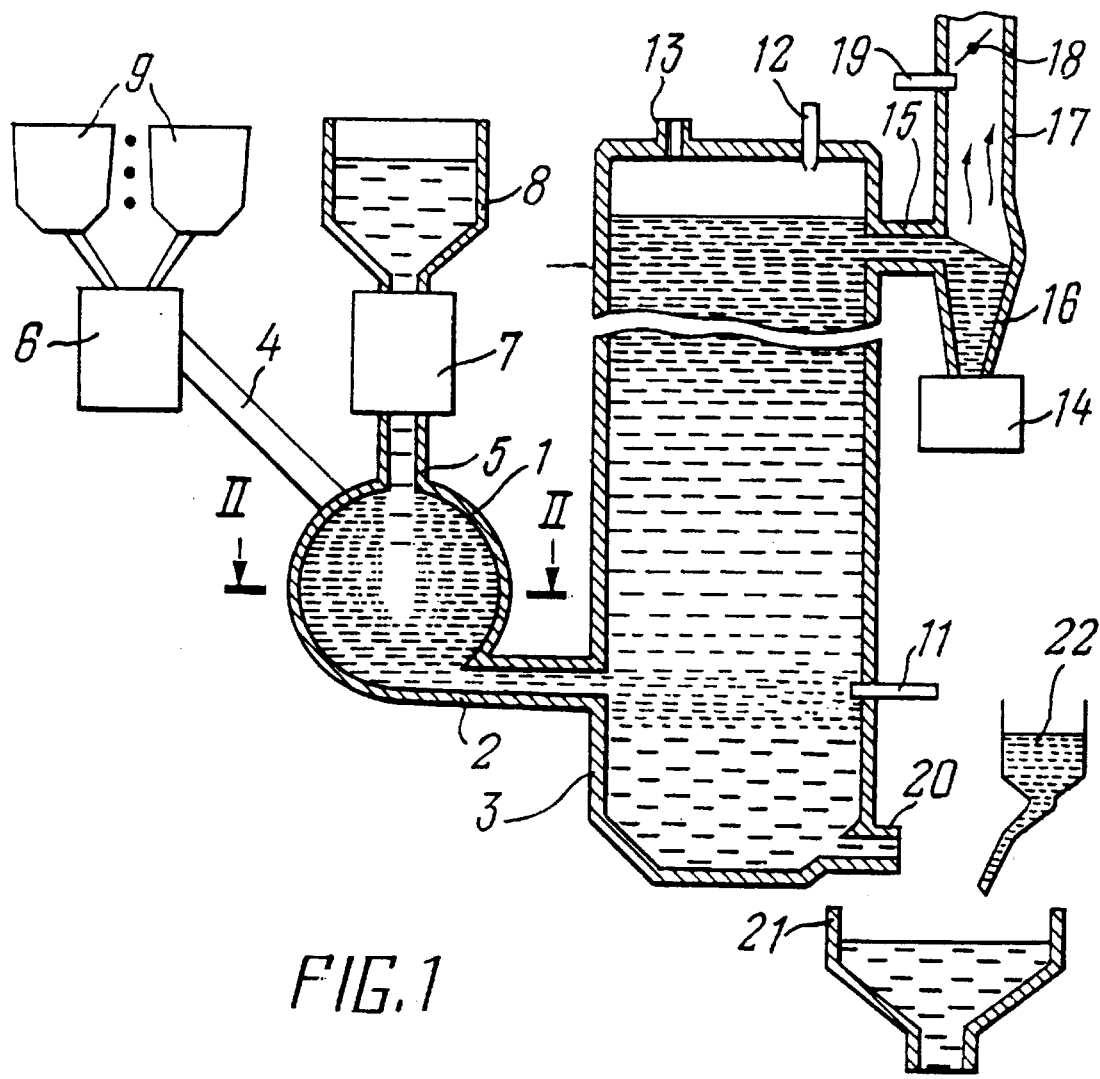
FIG. 1 shows a flow diagram of a continuous refinement unit.

The process of continuous steel production, according to the present invention, is realized in a unit, which comprises (FIG. 1) a reaction chamber of a spherical shape 1, connected via a cylindrical channel 2 to a refining sump 3. The ratio of the reaction chamber 1 to the diameter of the connection channel 2 is selected within 3 to 12 depending on the output of the unit and the operating pressure in the chamber as required. The reaction chamber is connected via corresponding channels 4, 5 to a device 6 for preparing and supplying bulk materials and a device 7 for feeding molten metal. A ladle 8 is necessary for pouring cast iron, and supply bunkers 9 are used for receiving bulk materials. The device 7 performs the function of delivering the metal to the reaction chamber where processes proceed under excess pressure. This device can be realized, for example, by means of a slide gate, an intermediate funnel and a vertical channel, which, when filled, provides a hydrostatic pressure specified by the column of liquid and its density greater than the excess pressure in the reaction chamber 1, which can be achieved also by building up an excess pressure in a supply ladle. For bulk materials to be prepared and delivered to the reactor of said bulk materials (solid oxidants, reducing agents, slag-forming materials) provision is made of the device 6 which is implemented on the basis of known assembles and devices, for instance, batchers, a mixer, an intermediate bunker, a screw-type feeder or a pump, and a control unit.

Figure 2:
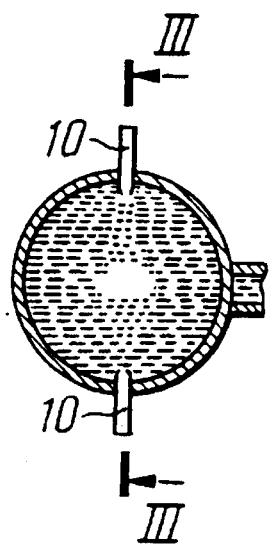
FIG. 2 is a cross-section I—I of FIG. 1 of a reaction chamber
Figure 3:
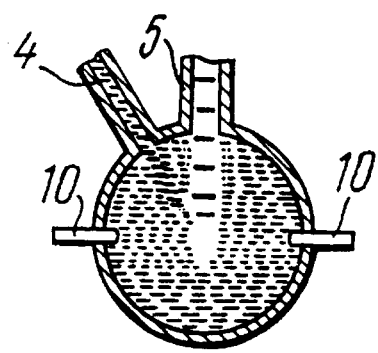
FIG. 3 is s cross-section II—II of FIG. 2 of the reaction chamber, turned through 90°.
Figure 4:
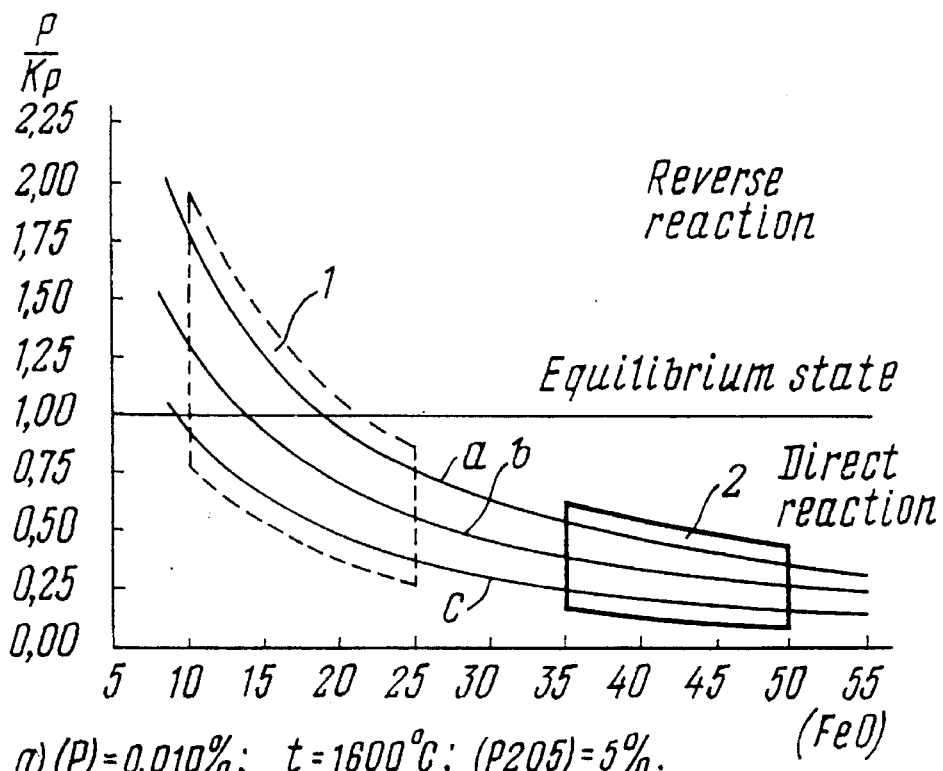
FIG. 4 is the dependence of the thermodynamic conditions of the course of dephosphorization reactions on the state of oxidation of slag.
Figure 5:
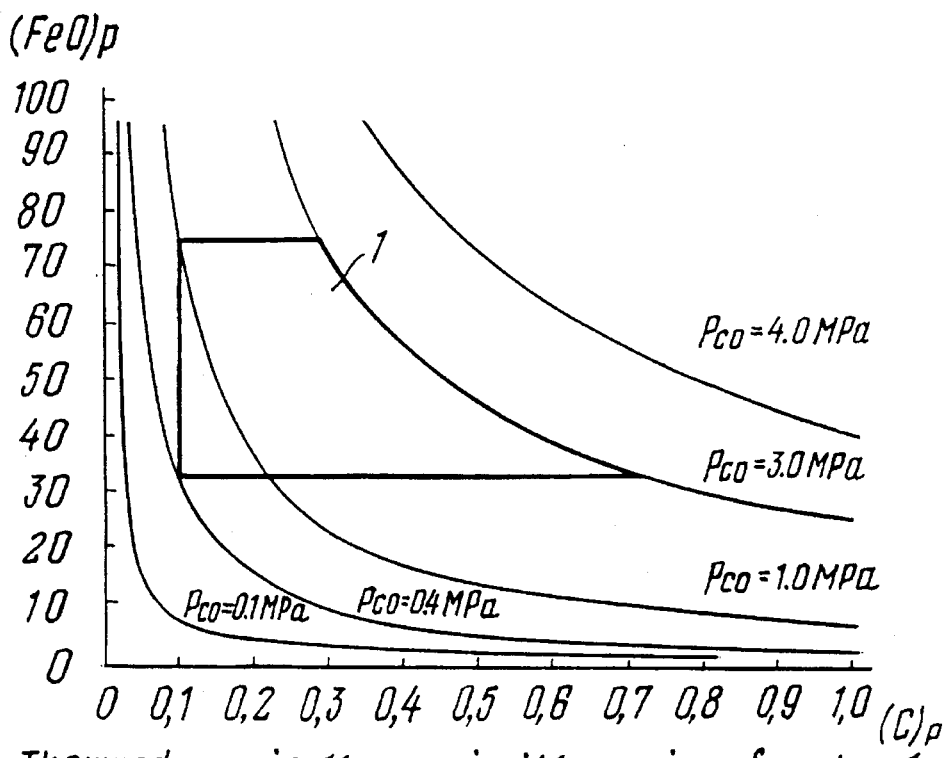
FIG. 5 shows the relationship of the equilibrium concentrations of carbon in metal and of Fe oxides in slag with different pressure in the system.
Figure 6:
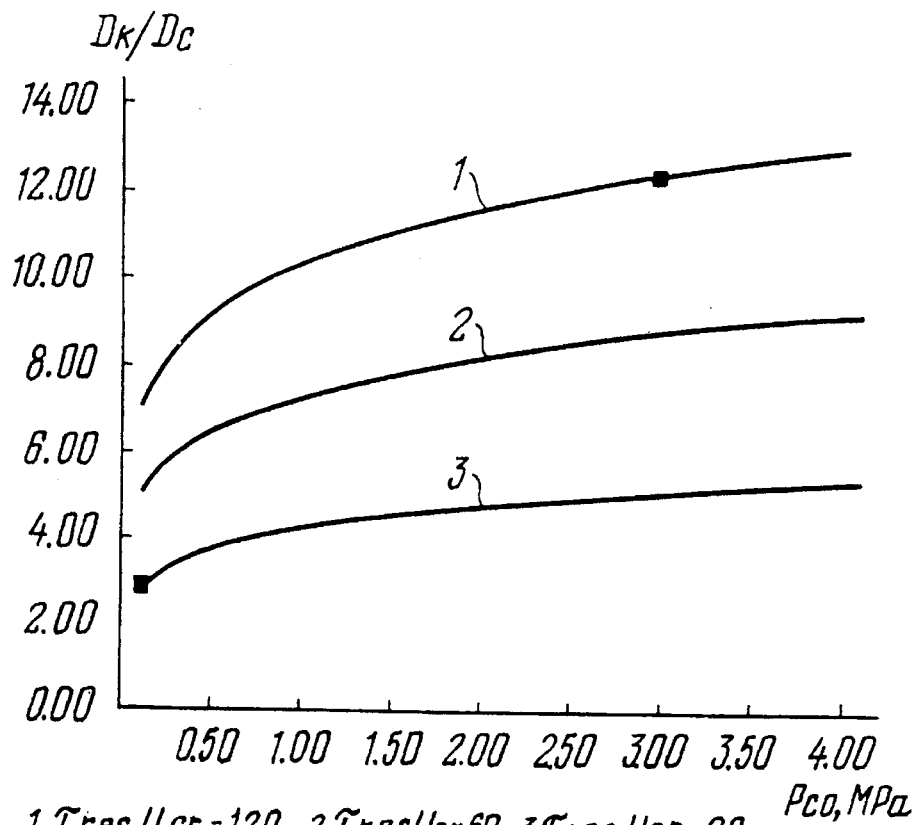
FIG. 6 characterized the relationship between the design parameters (ratio of diameters) of the reaction chamber and a connection channel and the pressure in said chamber with different conditions of taking an outward flow off.
Figure 7:
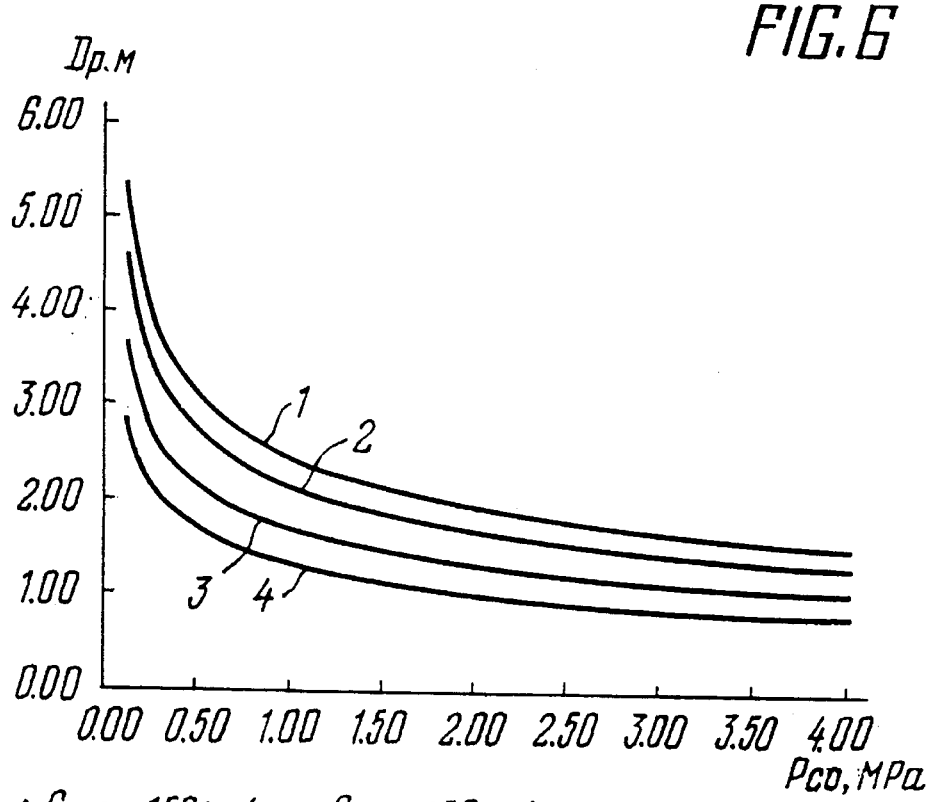
FIG. 7 shows the dependence of the dimensions of the reaction chamber on pressure with different capacity of the installation.

A device 10 for feeding gaseous oxygen to the reaction chamber is formed as lances mounted in counter pairs in the wall of the chamber in a diametric direction (FIG. 2). To create the high specific surface of contact of the metal-gas phases and the most favourable conditions for assimilating the bulk materials and also for reducing the temperature within a primary zone of interaction, the channels 4 and 5 for bulk materials and molten metal supply extend in the common plane with said device 10 (FIG. 3).

In the refining sump 3, on the axis coincident with the axis of the connection channel is installed a lance 11. The direction of the lance is opposite to the egress of emulsion from the connection channel. This lance is necessary for feeding oxygen to the bottom part of the sump 3 to afterburn C oxides in the volume of the refinement unit and to damp the kinetic energy of the flow outgoing from the reaction chamber 1. This explains the site of installation and selection of the direction of an oxygen flow.

In the dome of the refining sump 3, a lance 12 is installed for feeding oxygen to regulate the temperature conditions, and a channel 13 for delivering the slag-forming mixtures necessary for refining the composition and physical properties of slag to be subsequently granulated in a device 14 to produce cement, for example.

To organize the second stage of technologically cleaning the gases coming out of the refining sump, use is made of a horizontal channel 15 for taking gas and slag off, two vertical channels 16, 17 perpendicular to said horizontal channel 15, throttle means 18 and sprayer 19 for the supply of vapor.

A tap hole 20 serves to tap metal into a ladle 21 connected through chutes with the system of feeding deoxidants and alloying agents 22.

The process is carried out in the following manner.

Liquid iron from the supply ladle 3 by means of the device 7 for feeding metal is continuously admitted via the channel 5 to the reaction chamber 1 for reaction with oxygen gas and bulk materials. Said oxygen gas is fed through the oppositely directed lances 10. Bulk materials from the supply bunkers 9 with the aid of the device 6 are also continuously admitted into the reaction chamber 1. Depending on the diameter of the reaction chamber, the diameter of a connection channel and the preset output of the refinement unit, the consumption of iron is specified within 2 to 60 kg/s·m$^3$ of the volume of the reaction chamber, and that of oxygen is within to 0.11 kg/kg of metal, with the portion of a solid oxidizer being from 0.25 to 0.80. The consumption of slag-forming materials, reducing agents, heat carriers, additional oxygen for burning said heat carriers is calculated proceeding from the required basicity of slag, final metal composition and temperature on the basis of the material and heat balances of the process. In the reaction chamber and the refining sump there are created pressures of between 0.4 and 3.0 MPa and 0.15 and 0.20 MPa, respectively, depending on the selected dimensions and capacity.

The resultant two-phase flow is admitted from the reaction chamber 1 along the horizontal cylindrical channel 2 to the refining sump 3 where separation of metal, slag and gas takes place. The metal is accumulated in the bottom part of the refining sump 3 and tapped with the aid of the tap hole 20 into the ladle 21 where deoxidation and alloying proceed. The yield of a steel melt is 94 to 95%. The chemical composition of the metal and its temperature are determined by the required steel quality.

To the bottom part of the sump 3, to the zone of the yield of products from the reaction chamber 1 is fed oxygen gas, using the lance 11, at a rate of 0.01 to 0.04 m$^3$/kg of metal to afterburn C oxides, regulate the temperature conditions and to suppress the kinetic energy of the jet. Under the dome of the refining sump 3 using the lance 12, is supplied oxygen at a rate of 0.005 to 0.01 m$^3$/kg of metal to regulate the temperature conditions, and slag-forming mixtures are fed along the channel 13 for producing a slag of specified composition and physical properties required for granulation.

Waste gases are subjected to two steps of technological treatment (cleaning). The first step is carried out with the aid of a column of slag foam, which is formed owing to the structural dimensions selected for the refining sump 3. For the second step to be realized, use is made of the channels 15 to 17, the sprayer 19 for feeding vapor and the throttle device 18 which are all helpful in cleaning gas from dust and in slag/gas separation. The residual content of dust in the gases does not exceed 6 to 10 g/m$^3$. The slag goes to the granulator 14, at the exit of which is obtained a final product, say, a granulated mixture of required fractions for production of cement.

Industrial Applicability

The process for continuously refining metal is realized in unit having a capacity of 600 kg of steel a minute. The unit allows one to treat up to 0.5 kg/kg of cast iron, scale, slag and other iron-containing waste materials. The slag-forming materials, reducing agents and heat carriers used are represented by waste, such as dust lime, graphite, coke breeze siftings, etc. The resultant metal contains from 0.1 to 0.5% carbon; the content of Fe oxides in slag make up 6 to 8%.

Literature

1. Kazakov A. A. Continuous steel smelting processes. Moscow: Metallurgiya Publishers, 1977. 272 pages.
2. USSR Patent No. 382693, C2IC 7/00, 1970.
3. Sizov A. M. Gas dynamics and gas jets heat exchange in metallurgical processes. Moscow: Metallurgiya Publishers, 1987, 255 pages.
4. USSR Patent No. 480218, C2IC 1/00, 1965.
5. Medzhibozhsky M. Ya. Fundamentals of thermodynamics and kinetics of steel smelting processes. Kiev-Donetsk:Vishcha Shkola, 1986, 217 pages.
6. Baptizmansky V. I., Konovalov V. S., Isaev E. I. Increase in the output of suitable metal in steel smelting production. Kiev: Tekhnika, 1984, 175 pages.
7. Uzhov V. N., Valdenberg A. Yu. Gas cleaning with wet filters. Moscow: Khimiya Publishers, 1972, p.p. 108–121.
8. Yurlov A. M., Yaroshenko Yu. G. Inertia model of catching dust in gas washers with internal liquid circulation. Izvestiya vuzov. Ferrous metallurgy, 1988, N I, p.p. 131–135.

We claim:

1. In a process for continuous metal refinement comprising the steps of feeding molten metal to a reaction chamber, introducing an oxidizing agent and bulk materials additives, converting the metal and resulting slag into a foamy emulsion, withdrawing the emulsion to a refining sump, separating the metal and slag in the sump and removing the gas formed through a layer of emulsion, the improvement which comprises the oxidizing agent comprising 25–80% solid oxidant and 20–75% gaseous oxygen and being introduced at an oxygen flow rate of 0.06 to 0.11 kg/kg of metal, the molten metal being fed at a flow rate of 2 to 60 kg/cm$^3$ of the volume of the reaction chamber such to establish a pressure of from 0.4 to 3.0 MPa and 0.15 to 0.20 MPa in the chamber and sump, respectively.

2. A unit for continuously refining metal comprising a reaction chamber (1) having a first channel (5) for feeding molten metal and a second channel (4) for feeding bulk materials and a aperture (10) for supply of gaseous oxygen, a refining sump (3) with tap holes (15, 20) for slag and metal, respectively, to be withdrawn and with a branch for gas removal, and a cylindrical connection channel (2) therebetween, wherein the reaction chamber (1) is spherical, the aperture for supply of gaseous oxygen comprises a pair of opposing lances (10) in a single horizontal plane in the wall of the chamber (10), the ratio of the diameter of the chamber (1) to the diameter of the connection channel (2) is between 3 and 12, the first and second channels (4,5) for supply of bulk materials and molten metal, respectively, extending in a common plane with said pair of lances; the refining sump (3) having second lances (11, 12) for supplying oxygen and a third channel (13) for the delivery of slag-forming materials, one of the second lances (11) being in a bottom part of the sump (3) on an axis coincident with the axis of said connection channel (2) and an opposite wall of the sump, and the other second lance (12) and the third slag-forming material delivery channel (13) arranged in the dome of said refining sump (3), said tap hole for the slag and said branch for gas removal combining to form a horizontal channel (15) which divided into two vertical channels (16, 17) perpendicular to axis of the horizontal channel (16), the uppermost (17) of the two vertical channels comprising a throttle (18) and a vapor sprayer (19), and the lowermost (16) of the two vertical channels connected to a slag granulator (14), the ratio of the distances from the connection channel (2) to the slag withdrawing tap hole in the sump and to the metal withdrawing tap hole (20) being between 5 and 15.

* * * * *

UNITED STATES PATENT AND TRADEMARK OFFICE
CERTIFICATE OF CORRECTION

PATENT NO. : 5,558,695

DATED : September 24, 1996

INVENTOR(S) : Valentin P. Tsymbal, et al.

It is certified that error appears in the above-indentified patent and that said Letters Patent is hereby corrected as shown below:

On the title page: Item

"[73] Assignee:" for "Aktsionernoe Obschestvo Otkrytogo Tipa, Russian Federation", read --Aktsionernoe obschestvo otkrytogo tipa. Zapadno-Sibirsky metallurgichesky Kombinat.Novokuznetsk, Russian Federation--.

Signed and Sealed this

Twenty-ninth Day of April, 1997

Attest:

BRUCE LEHMAN

Attesting Officer

Commissioner of Patents and Trademarks